(12) United States Patent
Zhu

(10) Patent No.: US 11,181,917 B2
(45) Date of Patent: Nov. 23, 2021

(54) PATH PLANNING SYSTEM BASED ON STEERING WHEEL SELF ZEROING FOR AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 43 days.

(21) Appl. No.: 16/849,270

(22) Filed: Apr. 15, 2020

(65) Prior Publication Data
US 2021/0325887 A1    Oct. 21, 2021

(51) Int. Cl.
    *G05D 1/02* (2020.01)
    *B62D 6/00* (2006.01)
    *B62D 5/04* (2006.01)

(52) U.S. Cl.
    CPC ......... *G05D 1/0212* (2013.01); *B62D 5/0457* (2013.01); *B62D 6/00* (2013.01); *G05D 2201/0212* (2013.01); *G05D 2201/0213* (2013.01)

(58) Field of Classification Search
    CPC ......... G05D 1/0212; G05D 2201/0212; G05D 2201/0213; B62D 5/0457; B62D 6/00
    See application file for complete search history.

(56) References Cited

U.S. PATENT DOCUMENTS

2019/0061743 A1*  2/2019  Ozawa ................ B60W 10/184

\* cited by examiner

*Primary Examiner* — Rodney A Butler
(74) *Attorney, Agent, or Firm* — Womble Bond Dickinson (US) LLP

(57) ABSTRACT

Embodiments disclose a system and method to automatically turn and return a steering of an autonomous driving vehicle (ADV) to a center position. According to a first aspect, a system performs a turn by applying a steering command to an autonomous driving vehicle (ADV). In response to turning, the system determines a current percentage steering, speed, and heading direction of the ADV. The system selects a steering return trajectory profile from one or more steering return trajectory profiles based on the determined speed of the ADV. The system generates a steering return trajectory based on the selection. The system controls the ADV to return a steering to a center position based on the generated steering return trajectory.

20 Claims, 10 Drawing Sheets

PATH PLANNING SYSTEM BASED ON STEERING WHEEL SELF ZEROING FOR AUTONOMOUS VEHICLES

TECHNICAL FIELD

Embodiments of the present disclosure relate generally to operating autonomous driving vehicles. More particularly, embodiments of the disclosure relate to a path planning system based on steering wheel self-zeroing for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicle's steering system has the ability to return to its center (zero) position without any input. This automatic return to zero provide a smooth and comfortable path curve when a vehicle recovers from a turn.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Autonomous driving path planning can calculate a trajectory using various path planning algorithms/models. A trajectory to perform a 90 degrees or a u-turn may be calculated by such an algorithm. Such trajectories may have a wide turning path curve and steering the vehicle from a large steering angle back to a center position (e.g., zero degrees) may cause the vehicle path to overshoot/oscillate. and may be unsuitable for sharp turns.

Embodiments disclose a system and method to automatically turn and return a steering of an autonomous driving vehicle (ADV) to a center position. According to a first aspect, a system performs a turn by applying a steering command to an autonomous driving vehicle (ADV). In response to turning, the system determines a current percentage steering, speed, and heading direction of the ADV. The system selects a steering return trajectory profile from one or more steering return trajectory profiles based on the determined speed of the ADV. The system generates a steering return trajectory based on the selection. The system controls the ADV to return a steering to a center position based on the generated steering return trajectory.

According to a second aspect, an offline system generates one or more steering return trajectory profiles for the ADV. The system determines a trajectory for a vehicle returning a steering to a center position at a first speed, where the vehicle has performed a left or a right turn. The system determines a number of segments for the trajectory. The system associates percentage steer information for each of the segments. The system generates one or more steering return trajectory profiles based on the trajectory and the segmented percentage steer information.

Figure 1:
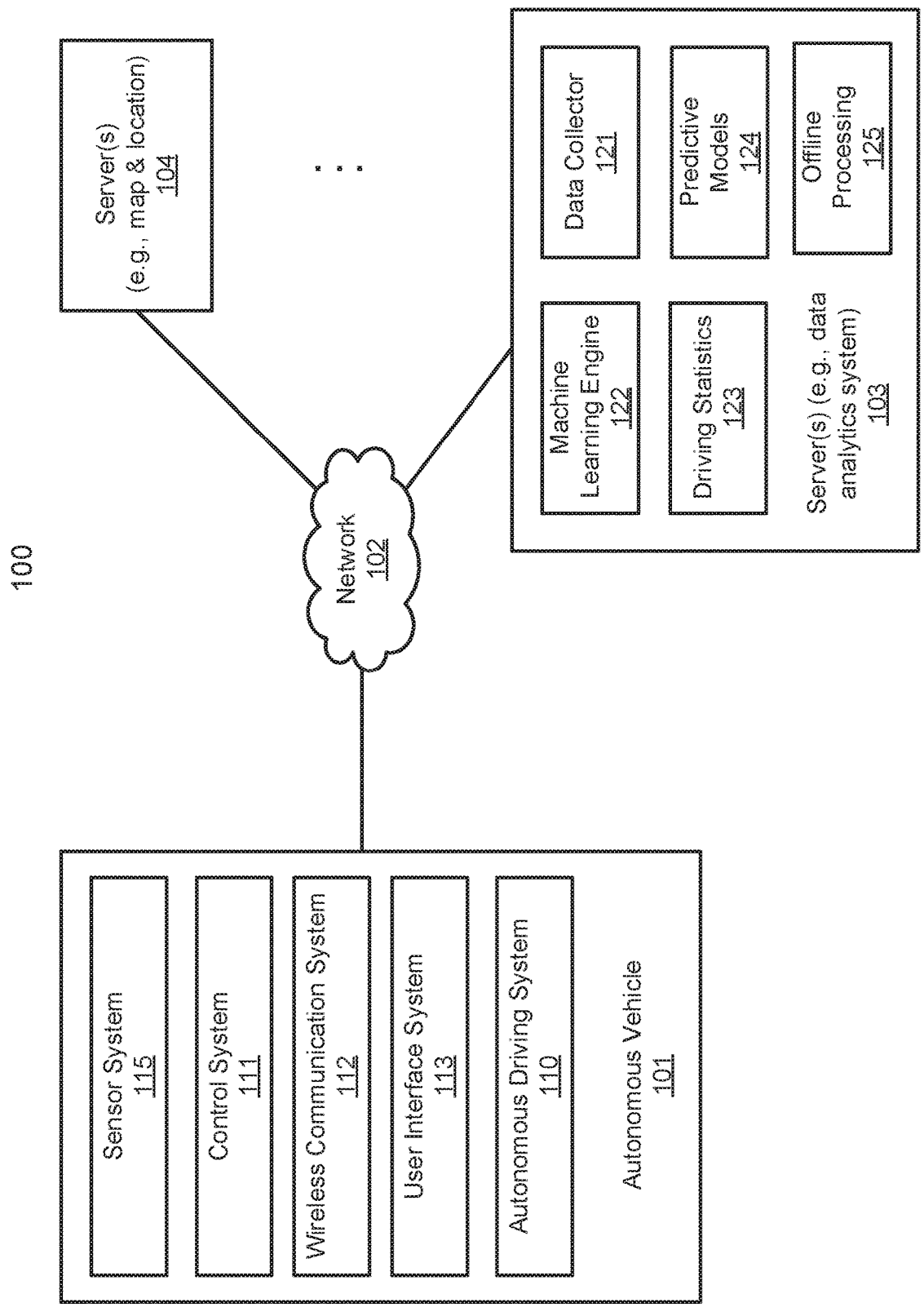
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
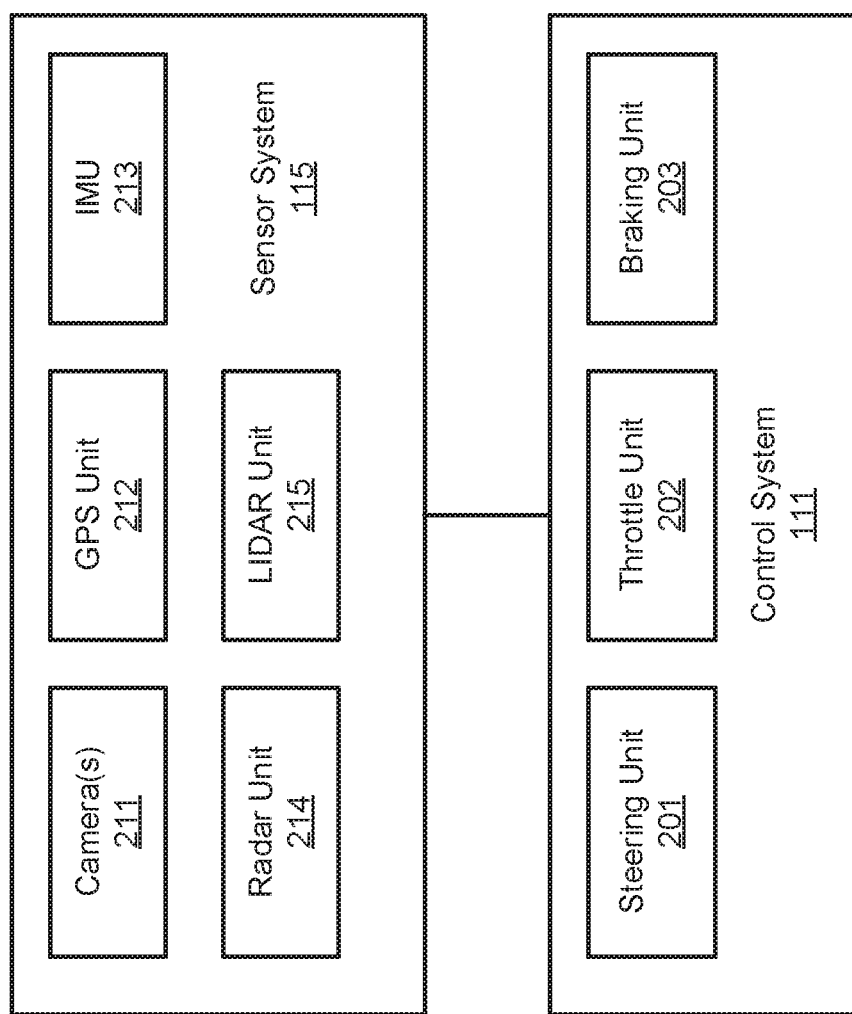
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including algorithms to perform a steering/turn and return to center steering using a steering return trajectory for the ADV. Algorithms/models 124 can then be uploaded onto ADVs to be utilized by the ADVs during autonomous driving in real-time.

In one embodiment, data analytics system 103 includes offline process or processing module 125. Offline process 125 can generate one or more steering return trajectory profiles for an ADV. In particular, different make and/or models of a vehicle can be associated with a set of steering return trajectory profiles.

Figure 3A:
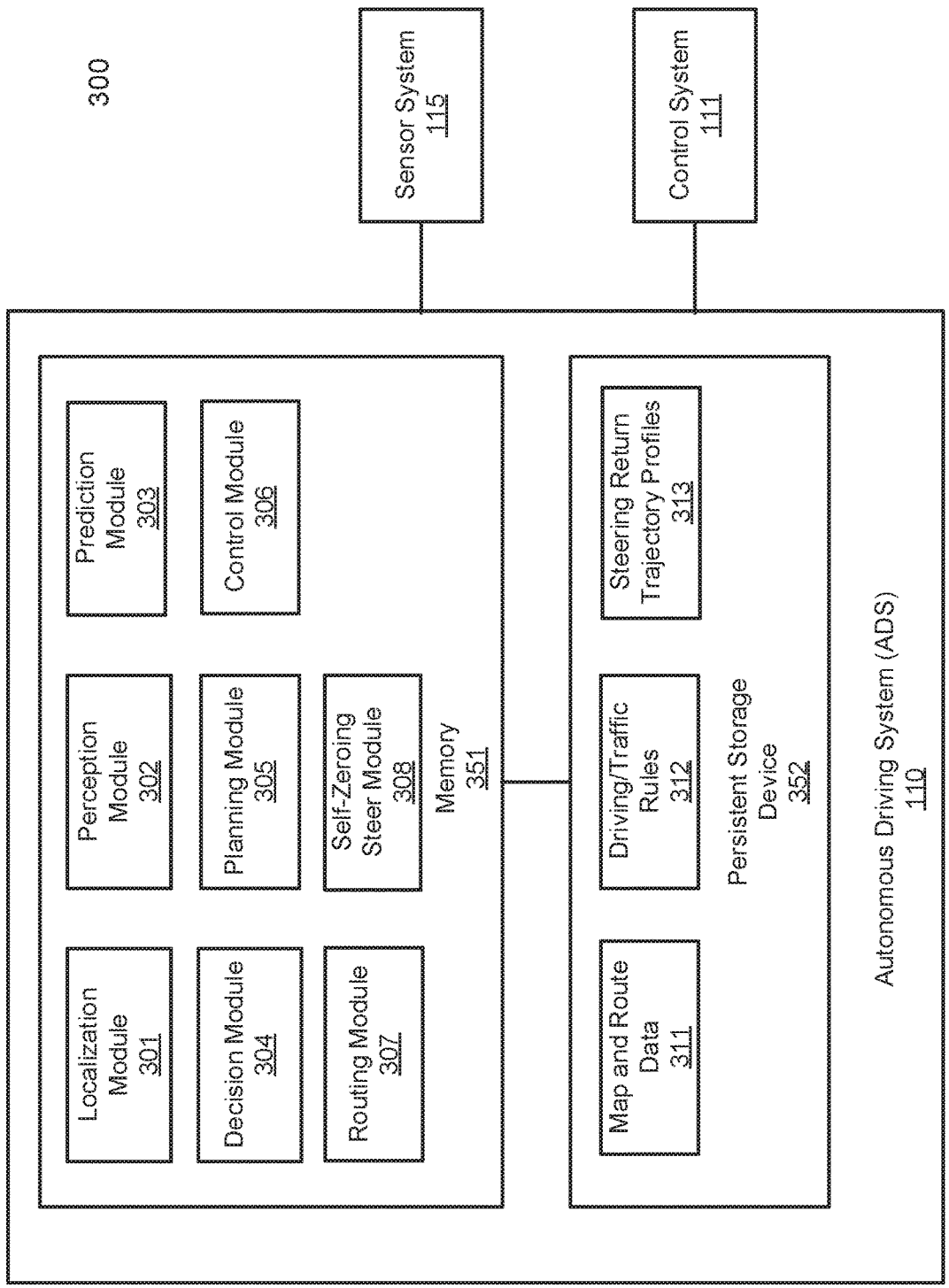
FIGS. 3A-3B are block diagrams illustrating an example of an autonomous driving system used with an autonomous driving vehicle according to one embodiment.
Figure 3B:
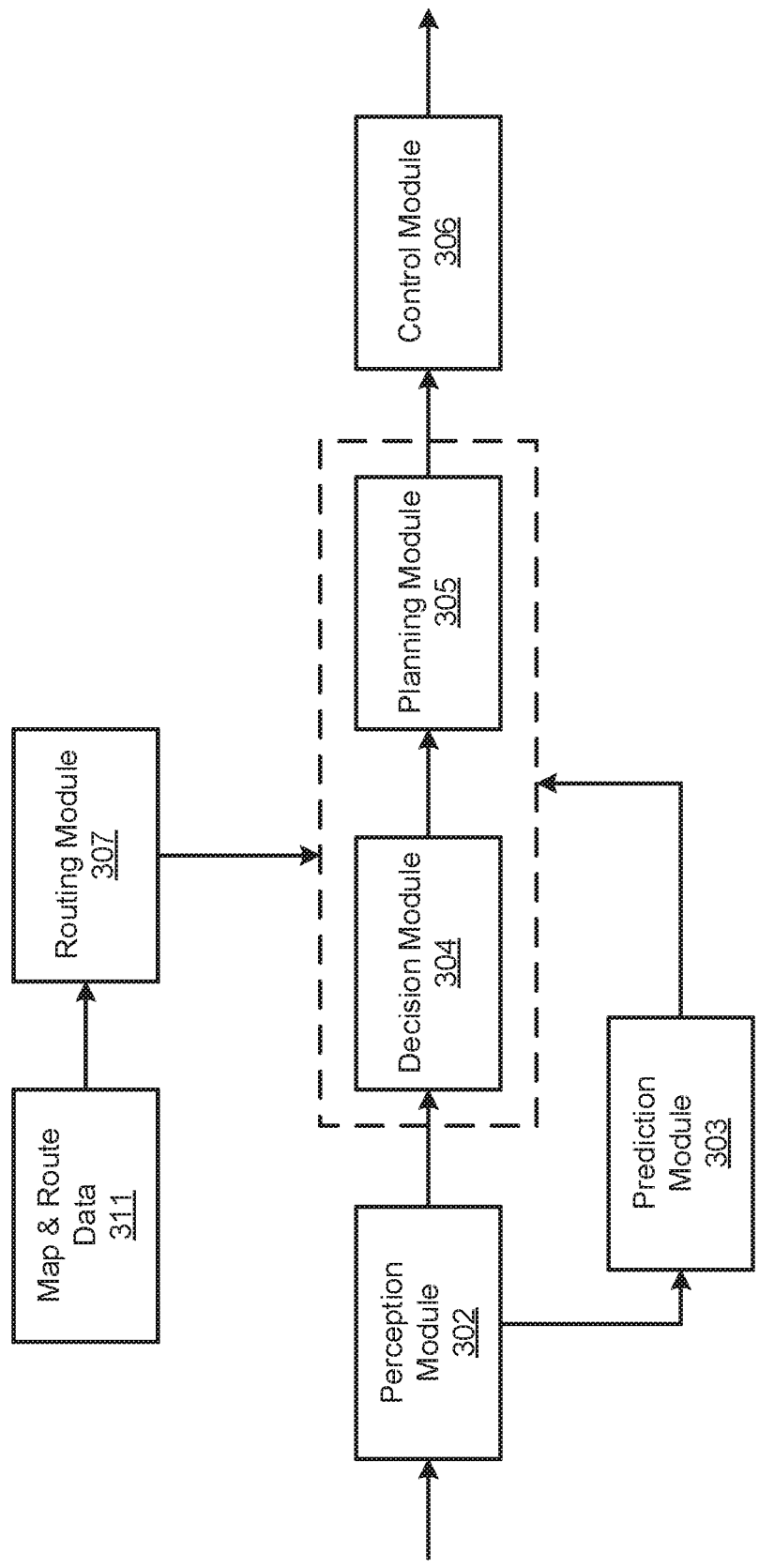

FIGS. 3A and 3B are block diagrams illustrating an example of an ADS used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and self-zeroing steer module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to effect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Decision module 304/planning module 305 may further include a collision avoidance system or functionalities of a collision avoidance system to identify, evaluate, and avoid or otherwise negotiate potential obstacles in the environment of the ADV. For example, the collision avoidance system may effect changes in the navigation of the ADV by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the ADV that would be swerved into. The collision avoidance system may automatically select the maneuver that is both available and maximizes safety of occupants of the ADV. The collision avoidance system may select an avoidance maneuver predicted to cause the least amount of acceleration in a passenger cabin of the ADV.

Figure 4:
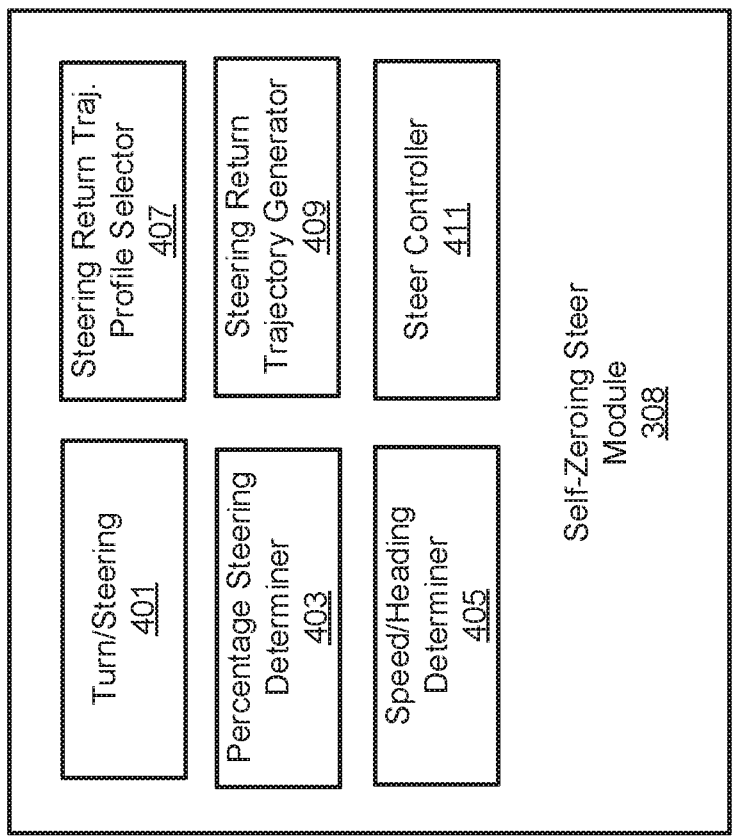
FIG. 4 is a block diagram illustrating a self-zeroing module according to one embodiment.

FIG. 4 is a block diagram illustrating an example of a self-zeroing steer module according to one embodiment. Self-zeroing steer module 308 can steer an ADV and return a steering of the ADV back to a center position based on a steering return trajectory profile. Referring to FIG. 4, self-zeroing steer module 308 can include submodules such as turn/steering 401, percentage steering determiner 403, speed/heading determiner 405, steering return trajectory profile selector 407, steering return trajectory generator 409, and steer controller 411. Turn/steering 401 can steer/turn an ADV so the ADV heading direction is a steered direction. Percentage steering determiner 403 can determine a current percentage steer of the ADV. The percentage steer may range from 100% to 0%. The 100% can be either to a left or to a right. Here, 0% steer represents a center steer position. Speed/heading determiner 405 can determine a current speed and/or a current heading direction of the ADV. Steering return trajectory profile selector 407 can select a steering return trajectory profile based on a current speed of the ADV. Steering return trajectory generator 409 can generate a steering return trajectory based on a selected profile. Steer controller 411 can control a steer of the ADV using the generated steering return trajectory. Note that although self-zeroing steer module 308 is illustrated as a standalone module, self-zeroing steer module 308 and planning module 305 may be an integrated module.

Figure 5:
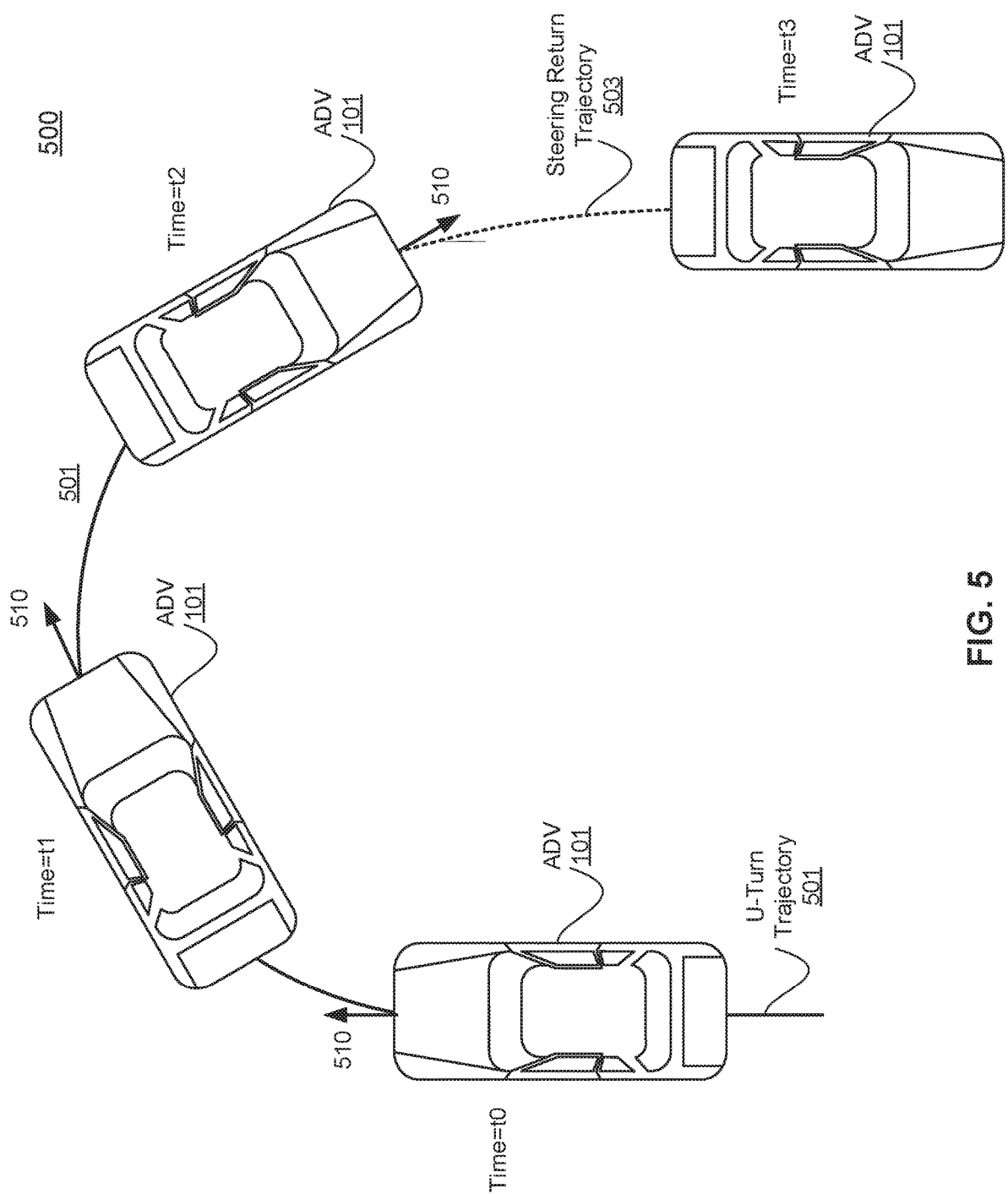
FIG. 5 illustrates an example time lapse of an ADV performing a u-turn using self-zeroing steer according to one embodiment.

FIG. 5 illustrates an example time lapse of an ADV performing a u-turn using self-zeroing steer according to one embodiment. Referring to FIG. 5, block diagram 500 shows ADV 101 with heading 510 at time=t0, t1, t2, and t3. At t0, an ADS (such as, e.g., ADS 110 of FIG. 3A) of ADV 101 may have planned a u-turn for ADV 101. In this case, the ADS planned a trajectory 501 to cause ADV 101 to steer a u-turn. At time=t1, ADV 101 turns following the u-turn trajectory 501.

In one embodiment, at time t2, if it is determined the u-turn is complete, based on a completion of trajectory 501, ADV 101 may determine a heading, speed, and percentage steering for the ADV 101. Based on the determined speed of the ADV 101, ADV 101 selects a steering return trajectory profile (as part of steering return trajectory profiles 313 of FIG. 3A) associated with a speed closest to the determined speed of the ADV 101. There may be a number of trajectories that have been configured, for example, based on prior driving data of a large number of vehicles, each corresponding to a particular vehicle speed. Here, each steering return trajectory profile can include one or more steering return trajectories with a range of steering (e.g., 100% steering to a left to 0% steering, 100% steering to a right to 0% steering) for a particular speed. A steering return trajectory represents a driving trajectory that self-returns the steering from 100% steering back to a center position (0% steering) with the steering released, e.g., no steering commands. In one embodiment, the steering return trajectory may include a sequence of x-y points with heading direction and percentage steering information for each x-y point. In another embodiment, the steering return trajectory may include a sequence of x-y segments with the heading direction and percentage steering information. The steering return trajectory may represent a pre-recorded trajectory previously driven for the ADV, either in a real-world or in a simulated driving environment. Note that although FIG. 5 illustrates a u-turn, self-zeroing steer module 308 can perform any type of turns, including sharp turns. Here, sharp turns can denote any turns having a steering wheel turned more than a 90-degree angle.

Although the steering return trajectory covers self-return for 100% to 0% steering, an ADV may have a current steering angle less than 100%. In one embodiment, ADV 101 generates a new steering return trajectory by trimming the 100% to 0% steering return trajectory from the selected steering return trajectory profile to match a current percentage steering of the ADV. Referring to FIG. 5, if a current steering is 80% steering to a right for ADV 101, when the u-turn completes at time=t2, the portion of steering return trajectory profile from 100% to 80% may be trimmed off. Here, in this case, the 80% to 0% steering portion can be trimmed and used to generate the new steering return trajectory. The new trimmed 80% to 0% steering trajectory 503 is then stitched to a current trajectory (e.g., u-turn trajectory 501) matching a heading direction and speed for ADV 101 at time=t2.

In one embodiment, the trim steering trajectory 503 is in a x-y coordinate system and the current trajectory 501 is in a station-lateral (SL) coordinate system. In one embodiment, trajectory 503 is converted to the SL coordinate system based on a current geographical location and a current heading of the ADV before trajectory 503 is stitched to trajectory 501.

Trajectory 503 then guides ADV 101 from 80% to 0% steering from time=t2 to time=t3 while controlling a speed for ADV 101 according to trajectory 503. Note that because steering return trajectory 503 corresponds to self-zeroing, no steering commands is required to be issued from time=t2 to time=t3. Note that self-zeroing or self-centering refers to a tendency of a vehicle to automatically return to a center aligned position (also denoted 0% steer or center position) when an operator let go of the steering wheel of a vehicle after a turn. When the operator let go of the steering wheel after a turn, any movement of the vehicle would cause a torque force to force the steering back to a center aligned position.

Figure 6:
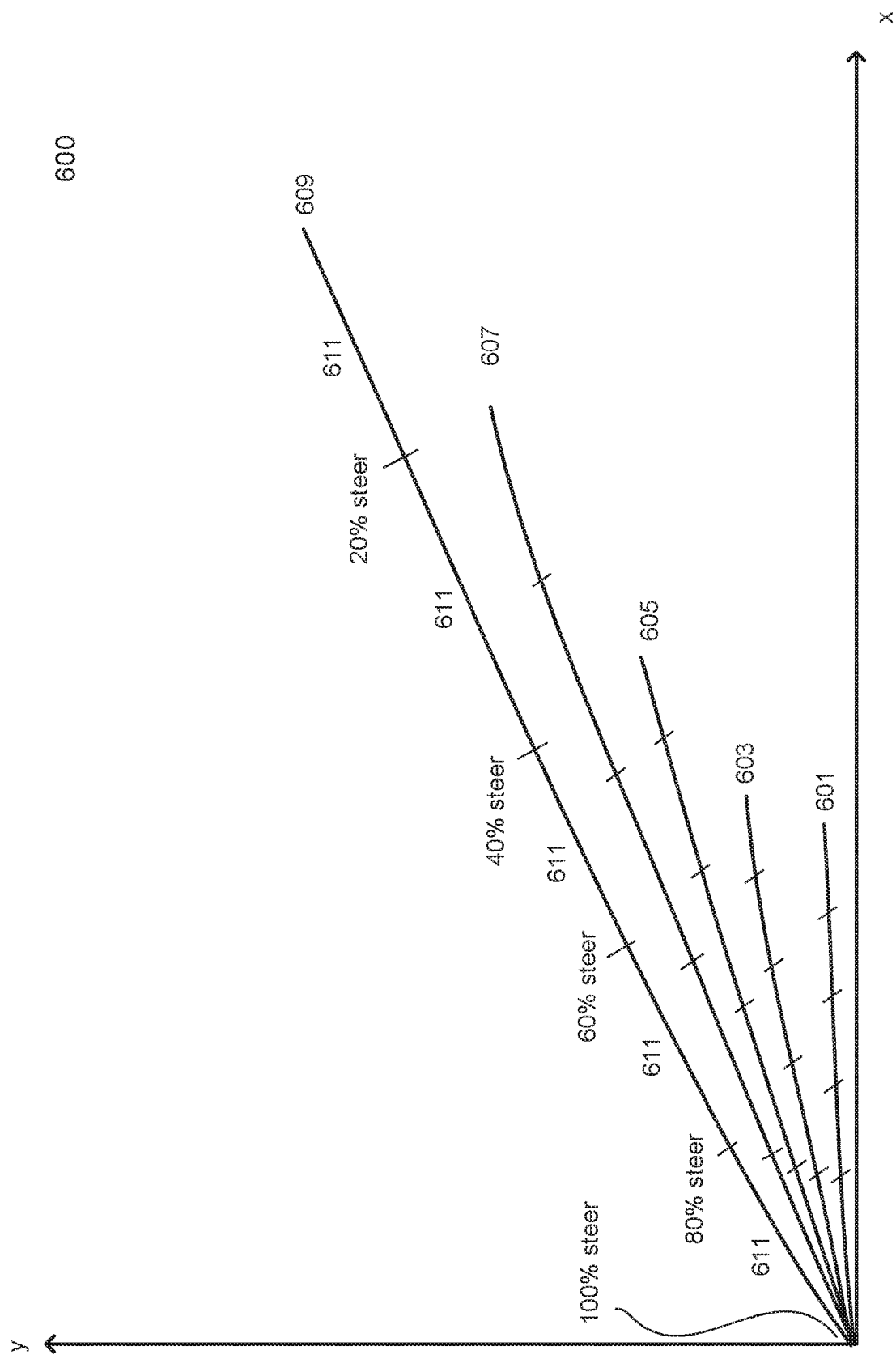
FIG. 6 illustrates steering return trajectory profiles for a vehicle according to one embodiment.

FIG. 6 illustrates steering return trajectory profiles for a vehicle according to one embodiment. Referring to FIG. 6, profiles 600 includes return trajectories 601-609. Each of the trajectories 601-609 may represent a self-zeroing trajectory (or steering return trajectory) at a particular speed. In one embodiment, trajectories 601-609 can include a metadata with speed information. For example, trajectory 601 may be associated with 5 m/s, trajectory 603 may be associated with 4 m/s, trajectory 605 may be associated with 3 m/s, trajectory 607 may be associated with 2 m/s and trajectory 609 may be associated with 1 m/s. The speed is used by ADV 101 to select one of trajectory 601-609 to match a current speed of the vehicle so the trajectories can be trimmed and stitched to match a current speed of the vehicle in real-time. In another embodiment, each trajectory can include a number of segments (or points) and each of the segments (or points) may be associated with a percentage steering. Here, FIG. 6 illustrates segments 611 to be associated with 20%, 40%, 60% 80%, and 100% steering. Note that although FIG. 6 illustrated five speed trajectories 601-609 with 20%, 40%, 60%, 80%, 100% steering segment granularities, trajectory profiles 600 may include any number of trajectories (e.g., at different speeds) with finer or coarser percentage steering granularities.

Figure 7:
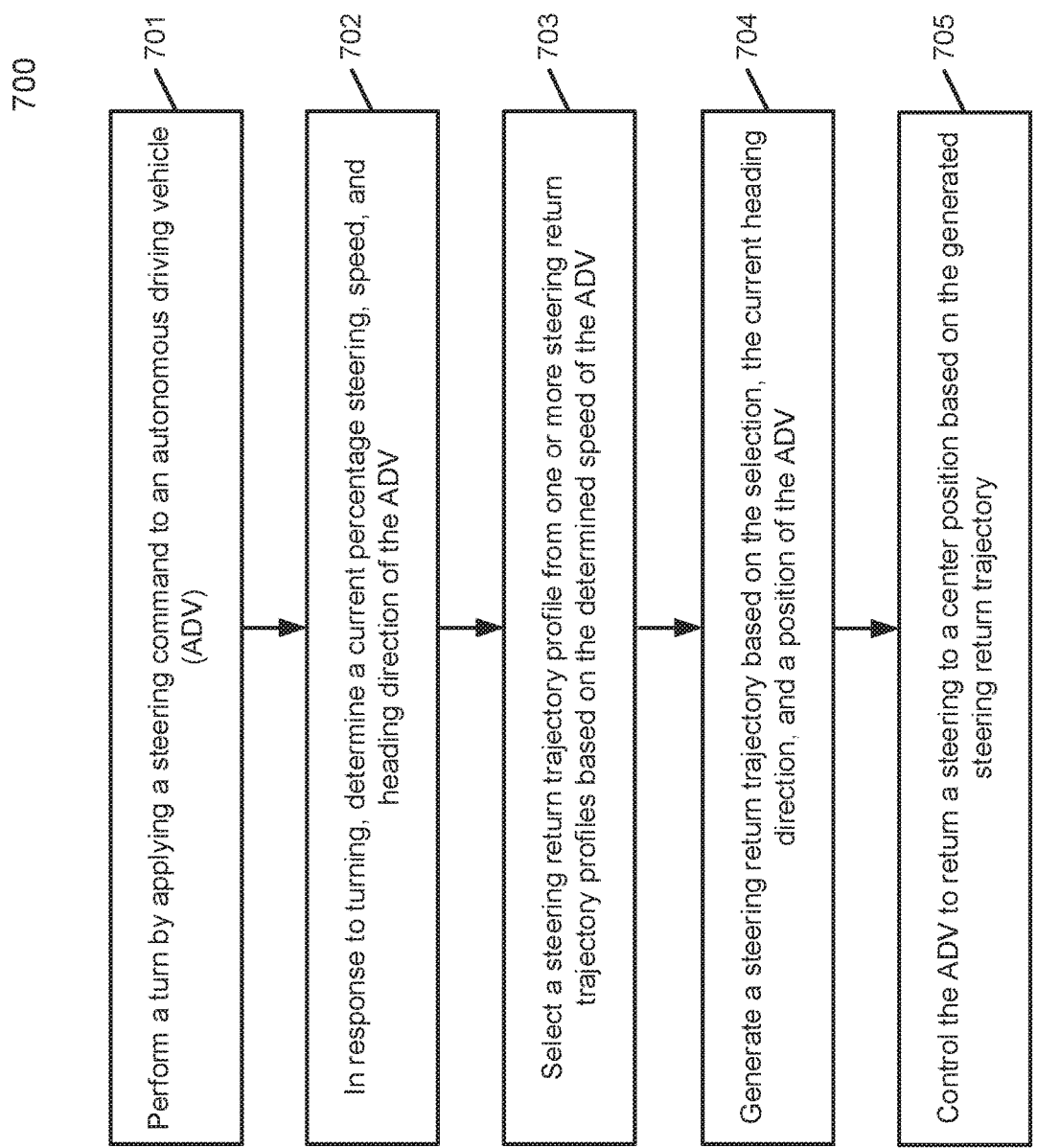
FIG. 7 is a flow diagram illustrating a method performed by an ADV according to one embodiment.

FIG. 7 is a flow diagram illustrating a method performed by an ADV according to one embodiment. Processing 700 may be performed by processing logic which may include software, hardware, or a combination thereof. For example, process 700 may be performed by self-zeroing steer module 308 of FIG. 4. Referring to FIG. 7, at block 701, processing logic performs a turn by applying a steering command to an autonomous driving vehicle (ADV). At block 702, in response to turning, processing logic determines a current percentage steering, speed, and heading direction of the ADV. At block 703, processing logic selects a steering return trajectory profile from one or more steering return trajectory profiles based on the determined speed of the ADV. At block 704, processing logic generates a steering return trajectory based on the selection. At block 705, processing logic controls the ADV to return a steering to a center position based on the generated steering return trajectory.

In one embodiment, generating a steering return trajectory based on the selected steering return trajectory profile includes trimming the steering return trajectory profile at a percentage steering to match the current percentage steering of the ADV and stitching the trimmed steering return trajectory profile to a current heading direction and a current position of the ADV to generate the steering return trajectory. In one embodiment, performing the turn includes performing a sharp turn, where a steering wheel is steered more than a 90 degrees angle for the sharp turn.

In one embodiment, each of the one or more steering return trajectory profiles is associated with a particular speed. In one embodiment, each of the one or more steering return trajectory profiles is pre-recorded using approximately 100% steer to a left returning to approximately 0% steer (center steer) and/or approximately 100% steer to a right returning to the approximately 0% steer (center steer).

In one embodiment, each steering return trajectory profile includes a plurality of trajectory segments, and each trajectory segment is associated with a percentage steering. In one embodiment, each of the one or more steering return trajectory profiles represent a trajectory to be performed following a turn to return the ADV to a center steer without apply a steering command.

Figure 8:
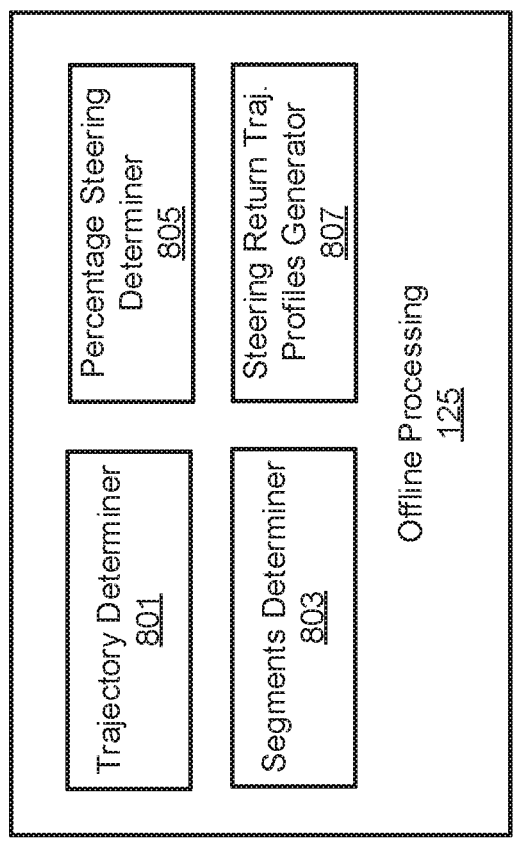
FIG. 8 is a block diagram illustrating an offline processing module according to one embodiment.

FIG. 8 is a block diagram illustrating an offline processing module according to one embodiment. Offline process module 125 can generate, offline, one or more steering return trajectory profiles. Referring to FIG. 8, offline process module 125 can include submodules such as trajectory determiner 801, segments determiner 803, percentage steering determiner 805, and steering return trajectory profiles generator 807. Trajectory determiner 801 can determine/retrieve or record a trajectory for a vehicle. The trajectory can include heading, speed, and location information for the vehicle. The trajectory can be recorded by a vehicle that is simulated or in a real-world environment. Segment determiner 803 can determine a number of segments for the trajectory. Percentage steering determiner 805 can determine percentage steering information for each of the segments. Steering return trajectory profiles generator 807 can generate one or more return trajectory profiles based on one or more trajectories and segmented percentage steer information. Note, the profiles can be generated offline, such as, by server 103, or online, by ADV 101 of FIG. 1 or any other vehicle.

To generate the profiles, in one embodiment, an operator operating a vehicle can physically turn (or via steering control commands) a steering wheel to steer the vehicle 100% (maximum steering) to the left. The operator applies a gas throttle (or via speed control commands) to maintain the vehicle at a steady speed. The operator releases the steering control while maintaining the vehicle at the first speed, such as 1 m/s. In one embodiment, offline process module 125 can collect (or record) data information for different points in time along a self-zeroing trajectory, e.g., where the self-zeroing trajectory is a trajectory with a steering released from 100% steering to self-return to a 0% steering (center position) after the vehicle performs a turn. The trajectory is associated (such as, using metadata) with different percentage steering along the trajectory to generate a steering return trajectory profile.

The above process can be repeated to generate a profile for steering the vehicle 100% to the right, and/or additional profiles at different speeds, such as 2, 3, 4, and 5 m/s. Note, each profile may be associated with a different speed. The maximal speed may be limited by a centripetal acceleration, $a = speed^2/r <= 1$, where r is a minimal turning radius (1/curvature), which corresponds to a turning radius for the vehicle with 100% steering.

In one embodiment, the data collection or trajectory recordings can be performed using a simulated model simulating the ADV in a simulation environment. Here, the steering and speed controls can be simulated so data for a number of steering return trajectory can be collected for 100% steering to a left to 0%, 100% steering to a right to 0%, and for the one or more speeds. In some embodiments, the collected data can include steering percentage, heading, speed, x-y locations of the vehicle at the different points along the trajectory. The collected data can be used to generate one or more steering return trajectory profiles. In one embodiment, a steering return trajectory profile includes a steering return trajectory and metadata information indicating the percentage steering at different segments/points along the steering return trajectory. Here, the generated trajectory can be partitioned/segmented into a number of segments such that a steering percentage can be associated with each of the segments. When an ADV retrieves a steering return trajectory profile, a steering return trajectory can be trimmed at any of the segment for stitching the steering return trajectory to a trajectory of the ADV.

Figure 9:
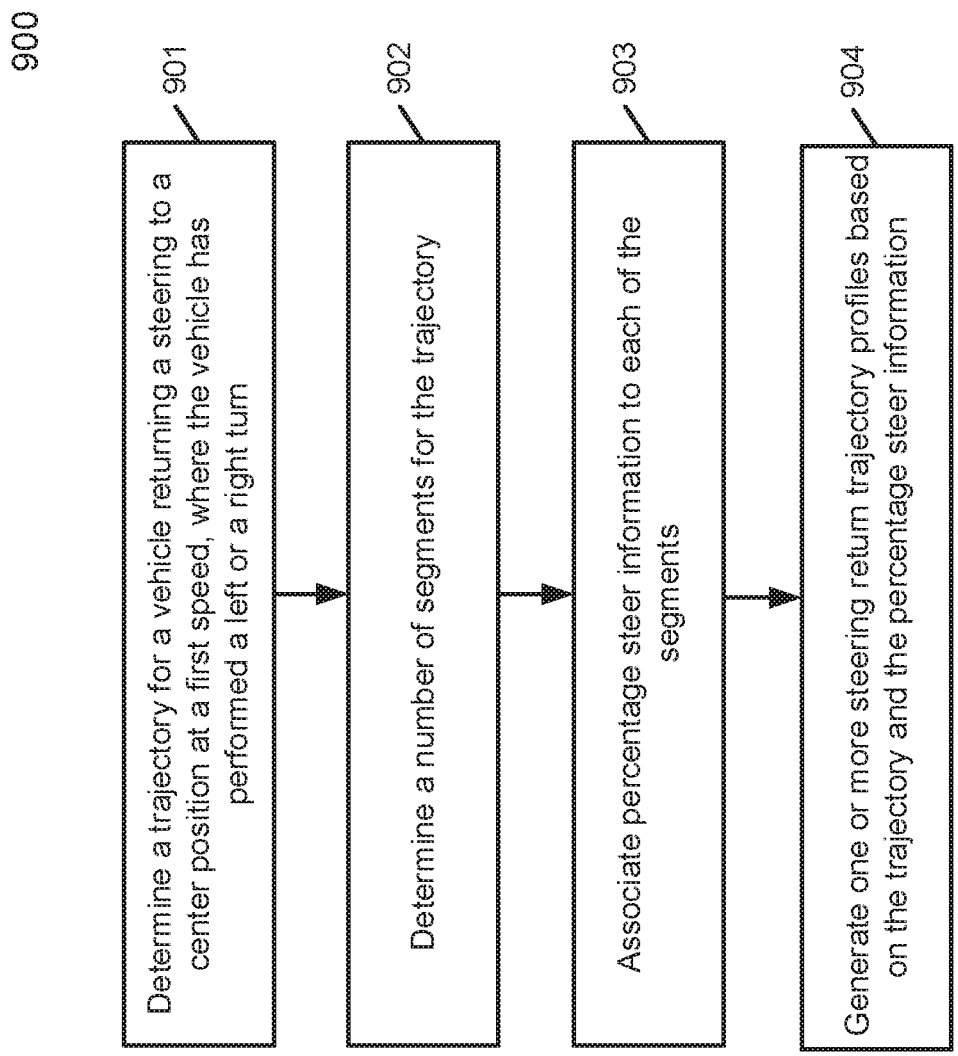
FIG. 9 is a flow diagram illustrating a method performed by an offline process according to one embodiment.

FIG. 9 is a flow diagram illustrating a method performed by an ADV according to one embodiment. Processing 900 may be performed by processing logic which may include software, hardware, or a combination thereof. For example, process 900 may be performed by offline process module 125 of FIG. 8. Referring to FIG. 9, at block 901, processing logic determines a trajectory for a vehicle returning a steering to a center position at a first speed, where the vehicle has performed a left or a right turn. At block 902, processing logic determines a number of segments for the trajectory. In another embodiment, the trajectory can be segments into one or more segments. At block 903, processing logic associates percentage steer information to each of the segments. At block 904, processing logic generates one or more steering return trajectory profiles based on the trajectory and the percentage steer information.

In one embodiment, processing logic further determines another trajectory for the vehicle at a second speed to generate another steering return trajectory, and generates the one or more steering return trajectory profiles based on the another trajectory. In one embodiment, each of the one or more steering return trajectory profiles is associated with a particular speed and the speed is used for trajectory selections.

In one embodiment, each of the one or more steering return trajectory profiles is generated using approximately 100% steer to a left returning to approximately 0% steer (center steer) and/or approximately 100% steer to a right returning to the approximately 0% steer (center steer). In one embodiment, the trajectory is generated for the vehicle corresponding to a simulation environment or a real-world environment. In one embodiment, each of the one or more steering return trajectory profiles represents a driving trajectory following a turn to return a steering of an autonomous driving vehicle (ADV) to a center steer without apply a steering command.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    performing a turn by applying a steering command to an autonomous driving vehicle (ADV);
    in response to turning, determining a current percentage steering, speed, and heading direction of the ADV;
    selecting a steering return trajectory profile from one or more steering return trajectory profiles based on the determined speed of the ADV;
    generating a steering return trajectory based on the selection; and
    controlling the ADV to return a steering to a center position based on the generated steering return trajectory.

2. The method of claim 1, wherein generating a steering return trajectory based on the selected steering return trajectory profile comprises:
    trimming the steering return trajectory profile at a percentage steering to match the current percentage steering of the ADV; and
    stitching the trimmed steering return trajectory profile to a current heading direction and a current position of the ADV to generate the steering return trajectory.

3. The method of claim 1, wherein performing the turn includes performing a sharp turn, wherein a steering wheel is steered more than a 90 degrees angle for the sharp turn.

4. The method of claim 1, wherein each of the one or more steering return trajectory profiles is associated with a particular speed.

5. The method of claim 1, wherein each of the one or more steering return trajectory profiles is generated using approximately 100% steer to a left returning to approximately 0% steer (center steer) and/or approximately 100% steer to a right returning to the approximately 0% steer (center steer).

6. The method of claim 1, wherein each steering return trajectory profile includes a plurality of trajectory segments, and each trajectory segment is associated with a percentage steering.

7. The method of claim 1, wherein each of the one or more steering return trajectory profiles represents a driving trajectory following a turn to return a steering of an ADV to a center steer without apply a steering command.

8. A data processing system, comprising:
    one or more processors; and
    a memory coupled to the one or more processors to store instructions, which when executed by the one or more processors, cause the one or more processors to perform operations, the operations including
        performing a turn by applying a steering command to an autonomous driving vehicle (ADV);
        in response to turning, determining a current percentage steering, speed, and heading direction of the ADV;
        selecting a steering return trajectory profile from one or more steering return trajectory profiles based on the determined speed of the ADV;
        generating a steering return trajectory based on the selection; and
        controlling the ADV to return a steering to a center position based on the generated steering return trajectory.

9. The system of claim 8, wherein generating a steering return trajectory based on the selected steering return trajectory profile comprises:
    trimming the steering return trajectory profile at a percentage steering to match the current percentage steering of the ADV; and
    stitching the trimmed steering return trajectory profile to a current heading direction and a current position of the ADV to generate the steering return trajectory.

10. The system of claim 8, wherein performing the turn includes performing a sharp turn, wherein a steering wheel is steered more than a 90 degrees angle for the sharp turn.

11. The system of claim 8, wherein each of the one or more steering return trajectory profiles is associated with a particular speed.

12. The system of claim 8, wherein each of the one or more steering return trajectory profiles is generated using approximately 100% steer to a left returning to approximately 0% steer (center steer) and/or approximately 100% steer to a right returning to the approximately 0% steer (center steer).

13. The system of claim 8, wherein each steering return trajectory profile includes a plurality of trajectory segments, and each trajectory segment is associated with a percentage steering.

14. The system of claim 8, wherein each of the one or more steering return trajectory profiles represents a driving trajectory following a turn to return a steering of an ADV to a center steer without apply a steering command.

15. A computer-implemented method for offline processing, the method comprising:
    determining a trajectory for a vehicle returning a steering to a center position at a first speed, wherein the vehicle has performed a left or a right turn;
    determining a plurality of segments for the trajectory;
    associating percentage steer information for each of the plurality of segments; and
    generating one or more steering return trajectory profiles based on the trajectory and the segmented percentage steer information, wherein the steering return trajectory profiles are utilized during autonomous driving of an autonomous driving vehicle (ADV) to return to an initial steering position after a steering turn operation.

16. The computer-implemented method of claim 15, further comprising:
    determining another trajectory for the vehicle at a second speed to generate another steering return trajectory; and generating the one or more steering return trajectory profiles based on the another trajectory.

17. The computer-implemented method of claim 15, wherein each of the one or more steering return trajectory profiles is associated with a particular speed and the speed is used for trajectory selections.

18. The computer-implemented method of claim 15, wherein each of the one or more steering return trajectory profiles is generated using approximately 100% steer to a left returning to approximately 0% steer (center steer) and/or approximately 100% steer to a right returning to the approximately 0% steer (center steer).

19. The computer-implemented method of claim 15, wherein the trajectory is generated for the vehicle corresponding to a simulation environment or a real-world environment.

20. The computer-implemented method of claim 15, wherein each of the one or more steering return trajectory profiles represents a driving trajectory following a turn to return a steering of an autonomous driving vehicle (ADV) to a center steer without apply a steering command.

* * * * *